United States Patent Office 2,870,142
Patented Jan. 20, 1959

2,870,142

PROCESS FOR THE PARTIAL REMOVAL OF OXO GROUPS

Albert Wettstein and Ludwig Ehmann, Basel, Switzerland, assignors to Ciba Pharmaceutical Products, Inc., Summit, N. J.

No Drawing. Application November 2, 1954
Serial No. 466,432

Claims priority, application Switzerland
November 13, 1953

4 Claims. (Cl. 260—239.55)

The present invention relates to a process for the partial removal of oxo groups from α-dioxo-compounds of the steroid series, or their enols and enolates.

One of the most usual methods for reductively removing oxo groups is the method of Wolff-Kishner [J. Russ. Phys. Chem. Soc., 43, 582 (1911); Chem. Abstr. 6, 347 (1912); Ann., 394, 86 (1912)] which has subsequently been modified and improved by Huang-Minlon [Journ. Amer. Chem. Soc., 68, 2487 (1946)]. In the latter reaction the carbonyl compound is boiled under reflux for about ½ hour in di- or tri-ethylene glycol with 10 percent alkali hydroxide and an excess of hydrazine hydrate. The solvent mixture is then distilled off until the residue has a boiling point of about 200° C., and then it is boiled for a few hours under reflux. This method when applied to α-dioxo-compounds of the steroid series or enols thereof, especially the 11:12-diketones or the $\Delta^{9:11}$-11-hydroxy-12-ketones gives poor results. Thus, not only is the oxo group in the 12-position removed, but the 11-oxo group is reduced to a 11-hydroxyl group or completely eliminated.

According to the present invention, it has been found that in the reaction of α-dioxo-compounds of the steroid series, or enols or enolates thereof, with hydrazine or a derivative thereof unexpectedly only one oxo group will be removed when carrying out the reaction at substantially lower temperatures, that is at a temperature not exceeding 160° C. It is therefore not necessary to work at a temperature at which all the low boiling constituents distil off. In this manner it is possible to carry out the removal of only one oxo group under substantially milder conditions, and to obtain mono-oxo compounds in good yield. Accordingly the new process of the present invention is characterized in that the aforesaid starting materials are heated with hydrazine or a derivative thereof in the presence of a basic alkali compound at a temperature at which the evolution of nitrogen occurs and not exceeding 160° C., and preferably within the range of about 120–150° C.

As starting materials there are used α-dioxo-compounds of the steroid series which contain the two vicinal oxo groups present, for example, in the 2- and 3-positions, the 3- and 4-positions, the 6- and 7-positions, the 16- and 17-positions, the 20- and 21-positions or more especially in the 11- and 12-positions, and also the corresponding enols, such as $\Delta^{9:11}$-11-hydroxy-12-ketones or $\Delta^{16}$-16-hydroxy-17-ketones, or their enolates, for example, metal enolates, enol-acylates or enol-ethers. The steroids may be derived, for example, from the oestrane, androstane, testane, aetiocholane, pregnane, spirostane, furostane, bufostane, cholane, cholestane, nor- or bisnorcholestane or ergostane series and stereoisomers thereof and they may contain, in addition to the two vicinal oxo groups, further substituents in the usual positions.

The reaction of the present process is carried out with hydrazine or a derivative thereof, such as hydrazine hydrate or semicarbazide or a salt thereof, for example, an acetate, chloride or sulfate, together with a basic alkali metal compound, above all an alkali metal hydroxide or alcoholate, such as sodium or potassium hydroxide, methylate or ethylate. The reaction is advantageously carried out in an organic solvent, especially mono- or polyoxy compounds, for example, glycol, a polyethylene glycol, for example, diethylene glycol or triethylene glycol; proplyene glycol, butanol or benzyl alcohol, or in a hydrocarbon such as xylene or tetralin. It is of advantage to heat the mixture at a temperature at which the evolution of nitrogen is strong such as at 120–150° C., and only the quantity of nitrogen calculated for the elimination of a single oxo group has been formed.

The following examples illustrate the invention, the parts and percentages being by weight unless otherwise stated and the relationship of parts by weight to parts by volume being the same as that of the gram to the cubic centimeter.

Example 1

40.4 parts of 3α-hydroxy-11:12-diketo-cholenic acid, which is partially in the enol form, are mixed with 20 parts by volume of a 10 N-solution of caustic soda, 200 parts by volume of ethylene glycol and 20 parts by volume of hydrazine hydrate. The mixture is heated for 2 hours while stirring at 135–145° C., during which 2200 parts by volume of nitrogen are split off. The reaction solution is diluted with 250 parts by volume of water, and after being cooled is introduced into 300 parts by volume of 2 N-hydrochloric acid. The precipitated reaction product is separated from the mother liquor, and dissolved in 500 parts by volume of a 5 N-solution of caustic soda, the solution is stirred with kieselguhr or filtration asbestos, then filtered, and poured into 200 parts by volume of acetic acid in 300 parts by volume of water. There are obtained 37.2 parts of 3α-hydroxy-11-keto-cholanic acid melting at 215–218° C.

Example 2

44.6 parts of $\Delta^{9:11}$-3α:11-dihydroxy-12-keto-cholenic acid-3-acetate are heated with 30 parts by volume of a 10 N-solution of caustic soda, 200 parts by volume of ethylene glycol and 20 parts by volume of hydrazine hydrate, while stirring, for 2–3 hours at 130° C., during which 2200 parts by volume of nitrogen split off. The cooled reaction solution is diluted with 250 parts by volume of water, and the diluted solution run into 300 parts by volume of 2 N-hydrochloric acid. The precipitated reaction product is filtered off with suction, washed and dried. There are obtained 39 parts of 3α-hydroxy-11-keto-cholanic acid melting at 212–215° C.

The starting material is obtained by dissolving 3α-hydroxy-11:12-diketo-cholanic acid in 3–5 times its quantity of glacial acetic acid on a boiling water bath and cooling the mixture. It melts at 156–158° C., and has the specific rotation $[\alpha]_D = +85°$ (in dioxane).

Example 3

50.2 parts of $\Delta^{9:11}$-3α:11-diacetoxy-12-keto-cholenic acid methyl ester are heated with 50 parts by volume of a 10 N-solution of caustic soda, 20 parts by volume of hydrazine hydrate and 200 parts by volume of ethylene glycol while stirring, at 125–130° C. until 2200 parts by volume of nitrogen have split off. The mixture is then cooled, diluted with 200 parts by volume of water, and run into 300 parts by volume of 2 N-hydrochloric acid. The precipitated reaction product is filtered off with suction, washed with water and dried. There are obtained 38 parts of 3α-hydroxy-11-keto-cholanic acid melting at 214–218° C.

Example 4

56.7 parts of $\Delta^{23}$-3α-acetoxy-11:12-diketo-24:24-diphenyl-cholene, which is partially in the enol form, are heated with 50 parts by volume of a 10 N-solution of caustic soda, 200 parts by volume of diethylene glycol and 20 parts by volume of hydrazine hydrate, while stirring, at 124–125° C. until 2200 parts by volume of nitrogen have split off. The reaction mixture is then poured into water and the precipitated reaction product is extracted with ether, and the ethereal solution is washed with water, dried and evaporated. The residue (51 parts) is dissolved in 100 parts by volume of pyridine and 50 parts by volume of acetic anhydride are added. After allowing the whole to stand overnight at room temperature the solution is concentrated in vacuo, the acetylation product is taken up in ether, and the ethereal solution is washed in succession with dilute hydrochloric acid, sodium bicarbonate and water. After drying the ethereal solution, it is concentrated to a small volume, 250 parts by volume of ethanol are added, 70 parts by volume of ethanol are evaporated off, and the whole is allowed to cool. 48.2 parts of $\Delta^{23}$-3α-acetoxy-11-keto-24:24-diphenyl-cholene crystallize out. The product melts at 168–169° C., and has the specific rotation $[\alpha]_D = +77°$ (in dioxane).

The $\Delta^{23}$-3α-acetoxy-11:12-diketo-24:24-diphenyl-cholene used as starting material can be prepared as follows:

160 parts of bismuth trioxide, 160 parts by volume of glacial acetic acid, and 1500 parts by volume of chlorobenzene are heated at the boil, while stirring, and in the course of one hour 300 parts by volume of liquid are distilled off until the distillation temperature exceeds 120° C. 71.6 parts of $\Delta^{23}$-3α-acetoxy-12β-hydroxy-11-keto-24:24-diphenyl-cholene, dissolved in 50 parts by volume of chlorobenzene and 300 parts by volume of glacial acetic acid, are added. A further 300 parts by volume of solvent is distilled off, while stirring, in the course of 1–1½ hours until the distillation temperature exceeds 120° C., the color of the reaction mixture changing from white to grey. The whole is then cooled, filtered, the clear filtrate is evaporated, and the residue is recrystallized from isopropyl ether. There are obtained 48.5 parts of $\Delta^{23}$-3α-acetoxy-11:12-diketo-24:24-diphenyl-cholene melting at 142–144° C., and having the specific rotation $[\alpha]_D^{23°} = +100°$ ($c=1$ in dioxane).

After evaporating and acetylating the residue with boiling acetic anhydride the mother liquor yields 19.4 parts of $\Delta^{23}$-3α-acetoxy-11:12-diketo-24:24-diphenyl-cholene-11-enolacetate melting at 165–167° C., and having the specific rotation $[\alpha]_D^{15°} = +125°$ ($c=1$ in dioxane).

Example 5

44.4 parts of 3β-hydroxy-11:12-diketo-iso-allospirostane, which is partially in the enol form, are heated with 20 parts by volume of a 10 N-solution of caustic soda, 200 parts by volume of ethylene glycol and 20 parts by volume of hydrazine hydrate, while stirring, at 130–135° C., until 2200 parts by volume of nitrogen have split off. The cooled solution is diluted with water, and the precipitated reaction product is extracted with a mixture of ether and chloroform (4:1). The extract is then washed with water, dried and evaporated. By crystallizing the residue from a solution in ether or in a mixture of ether and pentane 29.7 parts of 3β-hydroxy-11-keto-iso-allospirostane melting at 216–227° C. are obtained. By recrystallization the melting point of the product is raised to 229–232° C., and it has the specific rotation $[\alpha]_D = -29°$ C. (in chloroform).

What is claimed is:

1. In a process for the partial removal of oxo groups from a member selected from the group consisting of cholenic acids, cholanic acids, their esters, cholenes and spirostanes wherein a member of the group consisting of 11,12-diketo derivatives of said compounds, the enols and enolates thereof is heated with a member of the group consisting of hydrazine and derivatives thereof in the presence of a basic alkali compound, the improvement which comprises employing a temperature at which nitrogen is evolved and which does not exceed 160° C.

2. A process according to claim 1, wherein the enols and enolates are $\Delta^{9:11}$-11-hydroxy-12-ketones and their enolates.

3. A process according to claim 1, wherein the reaction is carried out at a temperature of about 120–150° C.

4. A process according to claim 1, wherein the heating is continued until the quantity of nitrogen calculated for the removal of an oxo group has formed.

References Cited in the file of this patent
UNITED STATES PATENTS 2,656,363    Neumann    Oct. 20, 1953
2,839,528    Wettstein et al.    June 17, 1958

OTHER REFERENCES

Wintersteiner: Jour. Biol. Chem., 162, 725–33 (1946).
Organic Reactions, vol. IV, pages 378–385 (1948).
Fieser et al.: Natural Products Related to Phenanthrene, 3rd edition, pages 227–233 (1949).

UNITED STATES PATENT OFFICE
CERTIFICATE OF CORRECTION

Patent No. 2,870,142                                January 20, 1959

Albert Wettstein et al.

It is hereby certified that error appears in the printed specification of the above numbered patent requiring correction and that the said Letters Patent should read as corrected below.

Column 2, line 24, for "cholenic" read -- cholanic --; column 3, line 51, for "liquor yields" read -- liquors yield --.

Signed and sealed this 30th day of June 1959.

(SEAL)
Attest:

KARL H. AXLINE

Attesting Officer

ROBERT C. WATSON
Commissioner of Patents